(12) United States Patent
Hutchinson

(10) Patent No.: US 6,312,641 B1
(45) Date of Patent: *Nov. 6, 2001

(54) METHOD OF MAKING CONTAINERS AND PREFORMS INCORPORATING BARRIER MATERIALS

(75) Inventor: Gerald A. Hutchinson, Torrance, CA (US)

(73) Assignee: Plastic Fabrication Technologies LLC, Long Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,595

(22) Filed: Oct. 17, 1997

(51) Int. Cl.$^7$ .......................... B29C 45/13; B29C 45/14; B32B 1/08; B32B 27/36
(52) U.S. Cl. .......................... 264/513; 264/516; 264/255; 264/279; 428/36.6; 428/36.91; 428/480; 428/542.8; 220/62.22; 220/626
(58) Field of Search .................................. 428/35.7, 36.6, 428/36.7, 333, 480, 483, 36.91, 903.3, 524.8; 220/62.11, 62.12, 62.22, 611, 626; 264/250, 255, 259, 279, 513, 516

(56) References Cited

U.S. PATENT DOCUMENTS 3,224,043  12/1965  Lameris et al. ..................... 18/30

(List continued on next page.)

FOREIGN PATENT DOCUMENTS 0 019 438 A1   11/1980  (EP) .

(List continued on next page.)

OTHER PUBLICATIONS

Proceedings of 3rd International Conference on Rigid Polyester Packaging Innovations for Food and Beverages; Nova–Pak Americas '98; Jan. 26–27, 1998.

(List continued on next page.)

Primary Examiner—Rena L. Dye
Assistant Examiner—John J. Figueroa
(74) Attorney, Agent, or Firm—Knobbe Martens Olson & Bear, LLP

(57) ABSTRACT

A container of the type adapted to contain an ingestible product and configured to having a multi-layer wall portion. The wall portion includes a multi-component layer having at least two discreet sublayers with an interface extending between the sublayers and extending longitudinally of the container and terminating in a threaded end portion. One sublayer is virgin polyethylene terephthalate, and the other sublayer is a barrier formed of a copolyester of terephthalic acid of low permeability. An outer layer material formed of a recycled polyethylene terephthalate has a thickness greater than the thickness of the barrier sublayer. The several layer materials have refracted indices within the range of 1.55 to 1.75. A process for the production of a multi-layer plastic container involving injecting a virgin polyethylene terephthalate and a thermoplastic barrier material through a lamellar injection system to provide a composite-multilamellae stream. The composite stream is supplied to a premold to form an initial preform. Recycled polyethylene terephthalate is then supplied over the initial preform to form an outer layer of a final preform which is then subjected to a blow molding operation to form the container. Alternatively, virgin polyethylene terephthalate can be supplied to a premold to form an initial preform. Recycled polyethylene terephthalate and a thermoplastic barrier polymer are then injected through a lamellar injection system to form a composite stream of discreet lamella of these materials which are supplied over the initial preform to form a final preform which is then blow molded to the desired configuration.

20 Claims, 13 Drawing Sheets

U.S. PATENT DOCUMENTS

| | | | |
|---|---|---|---|
| 3,305,528 | 2/1967 | Wynstra et al. | 260/47 |
| 3,317,471 | 5/1967 | Johnson et al. | 260/47 |
| 3,395,118 | 7/1968 | Reinking et al. | 260/47 |
| 3,482,284 | 12/1969 | Rees | 18/30 |
| 3,719,735 | 3/1973 | Valyi | 264/89 |
| 3,813,198 | 5/1974 | Valyi . | |
| 3,819,314 | 6/1974 | Marcus | 425/526 |
| 3,869,056 | 3/1975 | Valyi | 215/1 C |
| 3,878,282 | 4/1975 | Bonis et al. | 264/97 |
| 3,947,176 | 3/1976 | Rainville | 425/130 |
| 3,966,378 | 6/1976 | Valyi | 425/242 B |
| 4,040,233 | 8/1977 | Valyi . | |
| 4,061,705 | 12/1977 | Marcus | 264/89 |
| 4,065,246 | 12/1977 | Marcus | 425/528 |
| 4,079,851 | 3/1978 | Valyi | 215/1 C |
| 4,092,391 | 5/1978 | Valyi | 264/97 |
| 4,145,392 | 3/1979 | Valyi | 264/513 |
| 4,149,645 | 4/1979 | Valyi | 215/1 C |
| 4,375,947 | 3/1983 | Marcus | 425/143 |
| 4,376,090 | 3/1983 | Marcus | 264/530 |
| 4,438,254 | 3/1984 | Doorakian et al. | 528/89 |
| 4,480,082 | 10/1984 | McLean et al. | 528/103 |
| 4,515,836 | 5/1985 | Cobbs, Jr. et al. | 427/425 |
| 4,538,542 | 9/1985 | Kennon et al. | 118/302 |
| 4,540,543 | 9/1985 | Thomas et al. | 264/526 |
| 4,578,295 | 3/1986 | Jabarin | 428/35 |
| 4,604,258 | 8/1986 | Valyi | 264/537 |
| 4,646,925 | 3/1987 | Nohara | 215/1 C |
| 4,647,648 | 3/1987 | Silvis et al. | 528/102 |
| 4,715,504 | 12/1987 | Chang et al. | 215/1 C |
| 4,741,936 | 5/1988 | Nohara et al. | 428/35 |
| 4,755,404 | 7/1988 | Collette | 428/35 |
| 4,830,811 | 5/1989 | Aoki | 264/513 |
| 4,937,130 * | 6/1990 | Clagett et al. | 428/35.7 |
| 4,940,616 | 7/1990 | Yatsu et al. | 428/35.7 |
| 4,956,143 | 9/1990 | McFarlane | 264/334 |
| 4,980,211 | 12/1990 | Kushida et al. | 428/367 |
| 5,094,793 | 3/1992 | Schrenk et al. | 264/171 |
| 5,115,075 | 5/1992 | Brennan et al. | 528/99 |
| 5,134,218 | 7/1992 | Brennan et al. | 528/99 |
| 5,143,998 | 9/1992 | Brennan et al. | 528/99 |
| 5,188,787 | 2/1993 | King et al. | 264/153 |
| 5,202,074 | 4/1993 | Schrenk et al. | 264/241 |
| 5,275,853 | 1/1994 | Silvis et al. | 428/35.4 |
| 5,300,541 | 4/1994 | Nugent, Jr. et al. | 523/414 |
| 5,354,532 | 10/1994 | Nakai et al. | 264/239 |
| 5,443,378 | 8/1995 | Jaroschek et al. | 425/130 |
| 5,443,766 | 8/1995 | Slat et al. | 264/37 |
| 5,464,106 | 11/1995 | Slat et al. | 215/12.1 |
| 5,472,753 * | 12/1995 | Farha | 428/35.7 |
| 5,489,455 | 2/1996 | Nugent, Jr. et al. | 428/36.91 |
| 5,491,204 | 2/1996 | Nugent, Jr. et al. | 525/523 |
| 5,508,076 | 4/1996 | Bright | 428/366 |
| 5,509,965 | 4/1996 | Harry et al. | 118/423 |
| 5,540,878 | 7/1996 | Schrenk et al. | 264/313 |
| 5,551,858 | 9/1996 | Yoshizawa et al. | 425/217 |
| 5,582,788 | 12/1996 | Collette et al. | 264/297.2 |
| 5,599,494 | 2/1997 | Marcus | 264/513 |
| 5,628,950 | 5/1997 | Schrenk et al. | 264/241 |
| 5,628,957 | 5/1997 | Collette et al. | 264/512 |
| 5,651,933 | 7/1997 | Slat et al. | 264/250 |
| 5,652,034 | 7/1997 | Seiner | 428/36.6 |
| 5,688,570 | 11/1997 | Ruttinger, Sr. | 428/357 |
| 5,688,572 | 11/1997 | Slat et al. | 428/36.91 |
| 5,728,439 | 3/1998 | Carlblom et al. | 428/36.91 |
| 5,731,094 * | 3/1998 | Brennan et al. | 428/474.4 |
| 5,759,654 | 6/1998 | Cahill | 428/36.21 |
| 5,772,056 | 6/1998 | Slat | 215/12.2 |
| 5,804,305 * | 9/1998 | Slat et al. | 428/36.7 |
| 5,906,285 | 5/1999 | Slat | 215/12.2 |
| 5,927,525 | 7/1999 | Darr et al. | 215/12.2 |

FOREIGN PATENT DOCUMENTS

| | | |
|---|---|---|
| 0 092 979 B1 | 11/1983 | (EP) . |
| 0 096 581 B1 | 12/1983 | (EP) . |
| 0 118 226 B2 | 9/1984 | (EP) . |
| 0 125 107 A1 | 11/1984 | (EP) . |
| 0 153 120 B1 | 8/1985 | (EP) . |
| 0 153 894 B1 | 9/1985 | (EP) . |
| 0 160 984 B1 | 11/1985 | (EP) . |
| 0 176 229 B1 | 4/1986 | (EP) . |
| 0 180 191 B1 | 5/1986 | (EP) . |
| 0 191 701 A2 | 8/1986 | (EP) . |
| 0 199 633 B1 | 10/1986 | (EP) . |
| 0 230 630 A2 | 12/1986 | (EP) . |
| 0 105 826 B1 | 3/1987 | (EP) . |
| 0 215 630 B1 | 3/1987 | (EP) . |
| 0 218 245 B1 | 4/1987 | (EP) . |
| 0 225 049 A2 | 6/1987 | (EP) . |
| 0 266 900 A2 | 5/1988 | (EP) . |
| 0 278 403 B1 | 8/1988 | (EP) . |
| 0 280 736 A1 | 9/1988 | (EP) . |
| 0 287 839 A2 | 10/1988 | (EP) . |
| 0 302 117 A1 | 2/1989 | (EP) . |
| 0 306 675 B1 | 3/1989 | (EP) . |
| 0 171 161 B1 | 6/1989 | (EP) . |
| 0 351 118 A2 | 1/1990 | (EP) . |
| 0 368 278 A2 | 5/1990 | (EP) . |
| 0 376 469 B1 | 7/1990 | (EP) . |
| 0 581 970 A1 | 2/1994 | (EP) . |
| 0 645 428 A1 | 3/1995 | (EP) . |
| 0 678 554 A1 | 10/1995 | (EP) . |
| 0 689 933 A2 | 1/1996 | (EP) . |
| 0689933 | 3/1996 | (EP) . |
| 0 653 982 B1 | 9/1997 | (EP) . |
| 0 794 007 A1 | 9/1997 | (EP) . |
| 0 894 604 A1 | 2/1999 | (EP) . |
| 1482956 | 8/1977 | (GB) . |
| 2011309 | 7/1979 | (GB) . |
| WO 87/05276 | 9/1987 | (WO) . |
| WO 89/08556 | 9/1989 | (WO) . |
| WO 90/07553 | 7/1990 | (WO) . |
| WO 93/07068 | 4/1993 | (WO) . |
| WO 93/25835 | 12/1993 | (WO) . |
| WO 94/01268 | 1/1994 | (WO) . |
| WO 94/19186 | 9/1994 | (WO) . |
| WO 94/25366 | 11/1994 | (WO) . |
| WO 95/00325 | 1/1995 | (WO) . |
| WO 95/07219 | 3/1995 | (WO) . |
| WO 95/18002 | 6/1995 | (WO) . |
| WO 95/22451 | 8/1995 | (WO) . |
| WO 95/34425 | 12/1995 | (WO) . |
| WO 96/20074 | 7/1996 | (WO) . |
| WO 96/35571 | 11/1996 | (WO) . |
| WO 97/02939 | 1/1997 | (WO) . |
| WO 97/26127 | 7/1997 | (WO) . |
| WO 97/30122 | 8/1997 | (WO) . |
| WO 97/40972 | 11/1997 | (WO) . |
| WO 97/43183 | 11/1997 | (WO) . |
| WO 97/44174 | 11/1997 | (WO) . |
| WO 99/43563 | 9/1999 | (WO) . |

OTHER PUBLICATIONS

White et al.; "High–Barrier Structural Thermoplastics Based on Diglycidyl Ethers"; Polymer Science; vol. 34(1) 1993; pp. 904–905.

"Mitsui B–010:Gas Barrier Polyester"; Chemical Date Sheet; Mitsui Chemicals, Inc.; Feb. 1, 1998.

Suematsu, "Growth Prospects and Challenges for PET in Asia/Japan Producers Perspective." Paper presented in Singapore, May 19–20, 1997.

* cited by examiner

METHOD OF MAKING CONTAINERS AND PREFORMS INCORPORATING BARRIER MATERIALS

FIELD OF THE INVENTION

This invention relates to gas-impermeable plastic containers and, more particularly, to multilayer beverage containers incorporating at least one gas-impermeable barrier material and processes for making such containers.

BACKGROUND OF THE INVENTION

In the plastic bottles adapted to contain carbonated beverages and the like, it is highly desirable that the bottles be formed of materials providing wall structures of low gas permeability to allow the beverages to be stored over long periods of time without substantial loss of carbonation which will cause the beverage to go "flat." It is also highly desirable that the container material be totally transparent so that the beverage stored within the container can be viewed by the consumer. In addition, it is necessary that the material forming the container or, at least the material on the inner surface of the container which is in contact with the beverage, have the approval of the United States Food and Drug Administration (FDA).

Polyethylene terepthalate (PET) is an FDA approved material which is widely used in forming plastic beverage containers. In addition, polyethylene terephthalate which has been recovered from previously used beverage containers and the like, so called recycled polyethylene terephthalate (RPET), is also used in making plastic beverage containers. While newly polymerized polyethylene terephthalate (commonly referred to as virgin PET) has, as noted above, FDA approval, recycled polyethylene terephthalate is not FDA approved and thus cannot be used next to the beverage. This has led to a practice in which beverage containers are formed of layered materials with the inner layer of virgin PET being in contact with the beverage wall and the outer layer of recycled PET being on the outside of the container. Both these various layers may be formed together by various techniques involving fusion or comolding, with or without an adhesive layer between the polyethylene terephthalate layers.

Polyethylene terephthalate is relatively permeable to carbon dioxide and oxygen so that containers formed of polyethylene terephthalate have a relatively short shelf life. In order to prolong the shelf life of such containers, it is known in the art to incorporate a barrier material into such containers. Typically, such containers may be formed of an interior layer of virgin polyethylene terephthalate, a barrier layer, and an outer layer formed of recycled polyethylene terephthalate. Containers of this nature are disclosed in U.S. Pat. No. 5,464,106 to Slat et al. As disclosed in Slat, a suitable container configuration includes an inner layer formed of polyethylene terephthalate or polyethylene naphthalate, an outer layer of recycled polyethylene terephthalate, and an intermediate barrier layer which may be formed of acrylonitrile copolymers, ethylene vinyl alcohol copolymers, vinyladene chloride copolymers, and copolymers of vinyladene chloride with vinyl chloride or methylacrylate. Various procedures are disclosed in Slat for forming the beverage containers of three layers, i.e., an interior layer of an FDA approved polymer, an intermediate barrier layer, and an outer layer such as recycled polyethylene terephthalate which does not have FDA approval. One technique involves the application of an inner layer polymer and a barrier layer polymer which are applied to an interior mold to form a preform. This can be accomplished by various techniques including coextrusion. This is followed by various procedures which can then involve an injection molding technique in which the outer layer is applied over the preform. The preform is then subjected to a blow-molding operation to arrive at the final product.

Another technique for forming beverage containers and similar multilayered articles involves so-called lamellar injection molding such as disclosed in U.S. Pat. No. 5,202,074 to Schrenk et al. As disclosed in the Schrenk patent, a plurality of thermoplastic polymers can be applied through respective extruders to a coextrusion feed block which functions to generate and arrange layers or lamella in any of a number of configurations. As described in Schrenk, using the designation of "A," "B," and "C" for three different polymers applied through extruders to a coextrusion feed block system, layer orientations of ABC, ABABA, or ABCBA configurations can be arrived at. In addition to the orientation of the various polymer materials, the thickness of individual layers or lamella can likewise be controlled, and in repetitive multiplication of the lamellar injection technique, the several polymer materials can be extruded in such thin layers that they become essentially a homogenous material. The Schrenk process discloses such lamellar injection systems in the production of plastic beverage containers involving multilayer structures incorporating an FDA-approved material such as polyethylene terephthalate with a barrier material such as ethylene vinyl alcohol.

Effective barrier materials used in the fabrication of container parisons are fusion blends of poly(ethylene terephthalate) and polyester-based copolymers as disclosed in U.S. Pat. No. 4,578,295 to Jabarin. As disclosed in Jabarin, such barrier materials include copolymers such as copolymers of terephthalic acid and isophthalic acid with one or more diols, particularly ethylene glycol in combination with other dihydroxy alcohols, specifically, 1,3 bis (2 hydroxy ethoxy) benzene. Other suitable reactants include sulfones such as bis(4-beta-hydroxy ethoxyphenol) sulfone and additives such as stabilizers, processing aids, pigments, etc. The barrier materials thus formulated can be mixed with polyethylene terephthalate to form intimate fusion blends of 80–90% PET and 10–20% polyester to form barriers that are about 20–40% better gas barriers to $CO_2$ transmission than PET alone.

Barrier materials of the type disclosed in the Jabarin reference have heretofore been used in formulations of long shelf life beverage containers by using such materials as blends with another FDA-approved material such as polyethylene terephthalate. As disclosed in a paper by Suematsu, "Growth Prospects and Challenges for PET in Asia/Japan Producers Perspective," presented in Singapore, May 19–20, 1997, a commercially available copolyester of the type disclosed in the Jabarin patent can be blended with polyethylene terephthalate to provide a material of substantially lower permeability to carbon dioxide and polyethylene terephthalate. This product identified as copolyester B010 is said to have substantially better barrier properties than polyethylene naphalate and to be useful as a blend with polyethylene terephthalate to form a barrier material having FDA approval.

SUMMARY OF THE INVENTION

In accordance with the present invention there is provided a container of the type adapted to contain an ingestible product such as a beverage and configured to having a multi-layer wall portion. The wall portion includes a multi-component layer having at least two discreet sublayers with an interface extending between the sublayers and extending longitudinally of the container and terminating in a threaded end portion. The end portion has externally upset threads which are adapted to receive a closure member such as a cap. One of the sublayers comprises virgin polyethylene terephthalate and the other sublayer comprises a barrier formed of a copolyester of terephthalic acid and at least one diol and has the permeability to carbon dioxide of no more than one-third that of the polyethylene terephthalate. The wall portion further comprises an outer layer material formed of a recycled polyethylene terephthalate which has a thickness greater than the thickness of the barrier sublayer of the interior layer. The sublayer materials and the outer layer material have refracted indices within the range of 1.55 to 1.75.

In a further embodiment of the invention there is provided a process for the production of a multi-layer plastic container. In carrying out the invention a first polymer of virgin polyethylene terephthalate and a second polymer of a thermoplastic barrier material as described above are injected through a lamellar injection system having a coextrusion feed block unit to provide a composite-multilamellae stream. The stream has at least one discreet lamella of the virgin polyethylene terephthalate and another of the copolyester. The composite stream is supplied to a premold to form an initial preform having inner and outer sublayers of the two materials. Recycled polyethylene terephthalate is then supplied over the initial preform to form an outer layer of the initial preform. The resulting final preform is subjected to a blow molding operation to form the multi-layered structure into a desired form.

In yet a further aspect of the invention virgin polyethylene terephthalate is supplied to a premold to form an initial preform having a thickness sufficient to form a self-supporting structure when removed from the premold. Thermoplastic polymers comprising a recycled polyethylene terephthalate and a thermoplastic barrier polymer as described above are then injected through a lamella injection system. The resulting composite stream comprises at least one discreet lamella of the virgin polyethylene terephthalate and another of the copolyester barrier material. The composite stream is supplied over the initial preform to form a final preform which is then subjected to a blow molding operation to arrive at the desired container configuration.

DETAILED DESCRIPTION OF THE INVENTION

Figure 1:
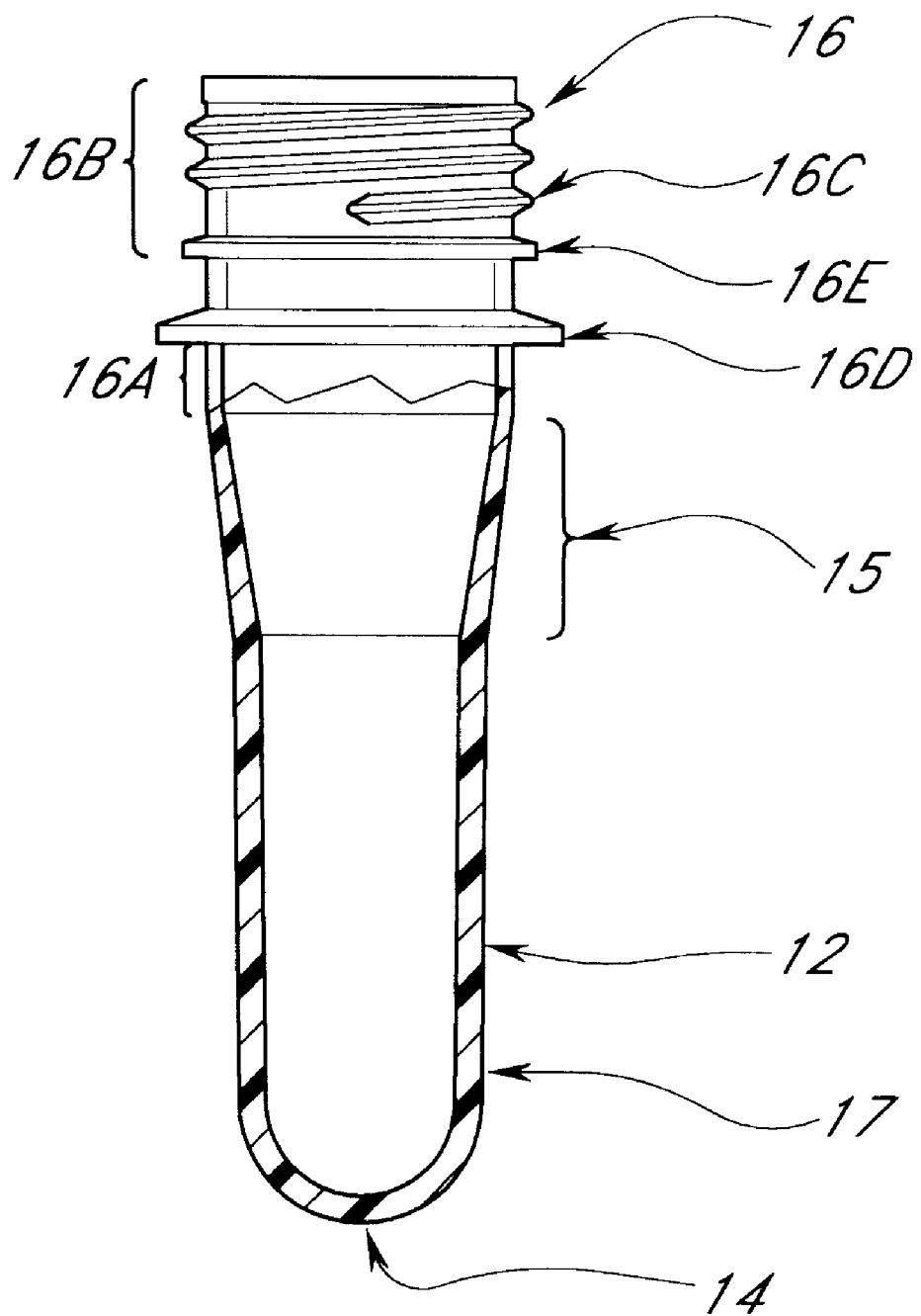
FIG. 1 is a side elevational view with parts broken away of a preform which can be prepared in accordance with the present invention.

The present invention involves multilayered barrier-incorporating containers suitable for containing ingestible materials, such as beverages and degradable food products, and preforms thereof and methods for their preparation through novel applications of injection molding and lamellar injection molding procedures. Specifically, procedures of the type, such as disclosed in the aforementioned patents to Slat et al and Schrenk, can be employed in forming beverage containers and the like embodying the present invention. In contrast with the use of injection molding techniques as disclosed in Slat to produce liners of multilayered preforms in which the layers can be readily separated, the present invention incorporates the several layers in configurations to retard such separation. Moreover, in the preferred embodiments of the invention, repeated sublayers are incorporated by lamellar injection molding techniques in order to minimize diffusion should layer separation occur.

The preparation of the multilayered containers in accordance with the present invention, can be characterized in terms of several discreet procedures as involving injection molding followed by injection molding over an initially-formed preform, characterized in this description by the shorthand notation "inject-over-inject," the formation of an initial preform-by-injection molding followed by application of lamellar injection molding, characterized by the shorthand notation "LIM-over-inject," and the formation of an initial preform by lamellar injection molding followed by injection molding over this preform, characterized in this description as "inject-over-LIM."

Injection molding and lamellar injection molding are in themselves well-known procedures and any suitable injection molding and lamellar injection molding techniques can be used in carrying out the present invention. As a practical matter, the injection molding procedures disclosed in the aforementioned patent to Slat et al can be used with appropriate modifications as discussed below, as well as the lamellar injection molding procedures of the aforementioned Schrenk et al procedures. For various detailed descriptions of the co-injection and co-extrusion procedures employed in this invention, reference can be made to the aforementioned Slat et and Schrenk et al patents, the entire disclosures of which are incorporated herein by reference.

As explained in greater detail below, one or more layers of a barrier material are employed in carrying out the present invention. Barrier materials having the requisite low permeability to gases such as air and carbon dioxide can be of any suitable type depending upon the mode or application as described below. Two types of barrier materials, one having FDA approval for use in contact with beverages or ingestible materials, suitable for use in the present invention, are the fusion blends of polyethylene terephthalate, as disclosed in the aforementioned patent to Jabarin and the paper by Seumatsu (hereinafter referred to as the "Jabarin barrier material") and thermoplastic polyethers, thermoplastic aromatic polyethers including poly(hydroxyamidethers) and hydroxy functionalized poly(amid-ethers) as disclosed in U.S. Pat. Nos. 5,115,075, 5,134,218, and 5,143,998 to Brennan et al, hereinafter referred to as the "Brennan barrier materials."

These Jabarin materials, because they have FDA approval can, like virgin polyethylene terephthalate (PET), be used in containers where they are in contact with beverages and the like intended for human consumption. The Brennan barrier materials do not have FDA approval. Brennan barrier materials, like post-consumer polyethylene terephthalate, and recycled polyethylene terephthalate (referred to herein collectively and individually as recycled polyethylene terephthalate or RPET) should be used in multi-layered containers only at remote locations with respect to the ingestible products.

In carrying out the present invention, an initial preform is prepared and then subjected to a subsequent operation to form at least a second layer of material. The initial preform can take the form of a single layer of virgin polyethylene terephthalate as in the inject-over-inject application or the LIM-over-inject application, or it can take the form of a multilayered preform of barrier material and virgin polyethylene terephthalate, as in the inject-over-LIM application. In the inject-over-LIM application, the innermost sublayer of the container which is in contact with the beverage or other material can be formed of the Jabarin barrier material or the virgin polyethylene terephthalate, with the latter embodiment being preferred. Here, recycled polyethylene terephthalate is used in the subsequent injection step to form the outer layer of the container. In the inject-over-inject and LIM-over-inject modes of operation, the inner layer of the final container is virgin polyethylene terephthalate. The outer layer is barrier material, as in the case of the inject-over-inject mode, or a composite of sublayers of barrier material and recycled polyethylene terephthalate, as in the case of the LIM-over-inject mold.

The various embodiments of the present invention are all advantageous in that they enable the use of an initial preform which can be made as a structurally-sound unit. Thus, in commercial operations the initial preforms can be prepared using mass manufacturing techniques, stored for periods ranging from hours to months, and then subsequently subjected to the application of one or more layers of barrier and/or recycled polyethylene terephthalate to form the final preform which can then be immediately subjected to a blow molding operation or, like the initial preform, stored for long periods of time before the final blow molding operation is carried out.

As described previously, suitable barrier materials having FDA approval and, thus, suitable for use in preparing initial preforms in any of the various embodiments described below are disclosed in U.S. Pat. No. 4,578,295 to Jabarin, the entire disclosure of which is incorporated herein by reference. Barrier materials which may be employed in carrying out the present invention in which barrier is not defined in the innermost layer of the preform are disclosed in the aforementioned U.S. Pat. Nos. 5,155,075, 5,134,218, and 5,143,998 to Brennan et al, the entire disclosures of which are incorporated herein by reference. Additional barrier materials may be used in lieu of the Brennan et al barrier materials. For example, the barrier material may take the form of other thermoplastic polymers such as various acrylic resins including polyacrylonitrile polymers and acrylonitrile styrene copolymers.

Turning now to the drawings and referring first to FIG. 1, there is illustrated a side elevational view of a preform with a portion broken away to show the wall structure of the preform, which can be prepared in accordance with any one of the several embodiments of the present invention. While, as described below, the wall structure of the preform can be configured in various multilayered structures, these are not shown in FIG. 1. The preform shown in FIG. 1 is configured for a carbonated beverage container that requires an oxygen and carbon dioxide barrier, but as will be understood by those skilled in the art, other preform configurations can be used depending upon the desired configuration and use of the final article. More particularly and as shown in FIG. 1, the preform comprises an elongated cylindrical body structure 12 having a closed bottom portion or "end cap" 14 extending through a transition section 15 which is generally of an upwardly-flared configuration and terminating in a threaded end or neck portion 16. The cylindrical portion 16 comprises a neck cylinder 16A and a neck finish 16B having external threads 16C, a support ring 16D, and an intermediate pilfer band 16E. The upper end portion can be of a conventional configuration, such as disclosed in the aforementioned patent to Slat, with the exception of the neck cylinder which can be formed of a composite structure, as described below, to retard delamination of the ultimate container.

The wall section 17 of the body structure, shown by the broken-away portion of FIG. 1, can be generally uniform throughout the body portion 12 of the preform up to the transition section 15 where it tapers down to narrow slightly to the uniform width of the neck portion. As described below, it is formed of a plurality of layers (not shown in FIG. 1), one of which is a barrier layer which is formed of FDA-approved material such as disclosed in the aforementioned patent to Jabarin or the aforementioned patents to Brennan et al, depending upon the particular procedure used to form the preform.

Figure 2:
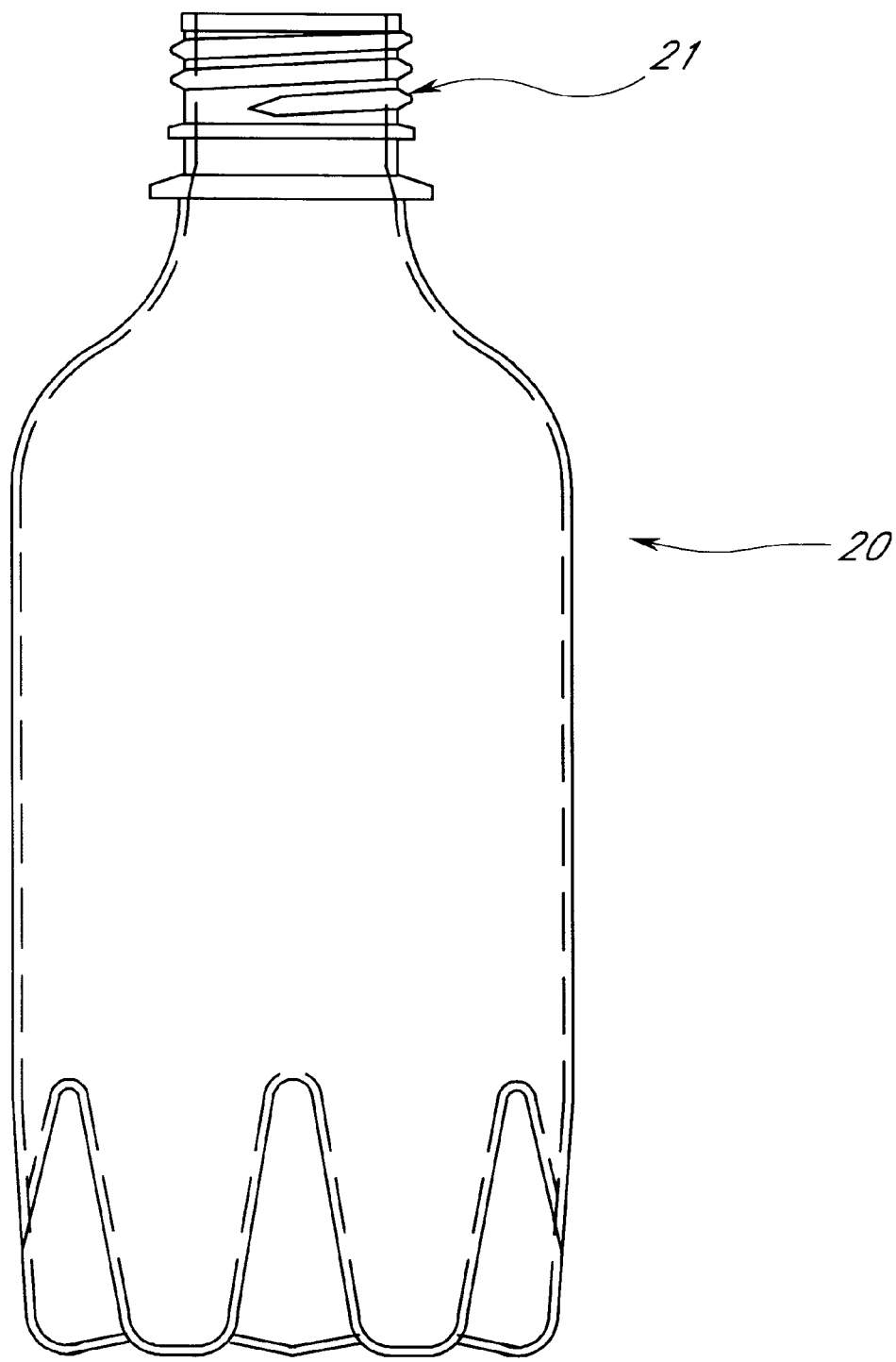
FIG. 2 is a side elevational view of a beverage container which can be formed by blow molding of the preform of FIG. 1.

After the preform is prepared in accordance with any of the procedures described below, it will be removed from the molding apparatus and subsequently subjected to a blow molding operation in order to form the final container as shown in FIG. 2. The blow molding operation can take place immediately in a single stage operation in which case little or no heating of the preform may be required, or it can take place after a storage period of days or months in a two-stage operation, in which case it will be necessary to heat the premold to a desired temperature for blow molding. In either case, the result is a beverage container as shown in FIG. 2 which comprises a biaxially-expanded body portion 20 conforming generally to the body portion 12 of the premold and an end portion 21 conforming to the end portion 16 of the premold. As indicated by comparison of FIGS. 1 and 2, the blow molding operation normally is restricted to the transition, body, and end cap sections of the premold with the end portion including the threads, pilfer ring, and support ring, which is used to support the preform in the blow molder, retaining the original configuration as found in the preform.

Figure 3:
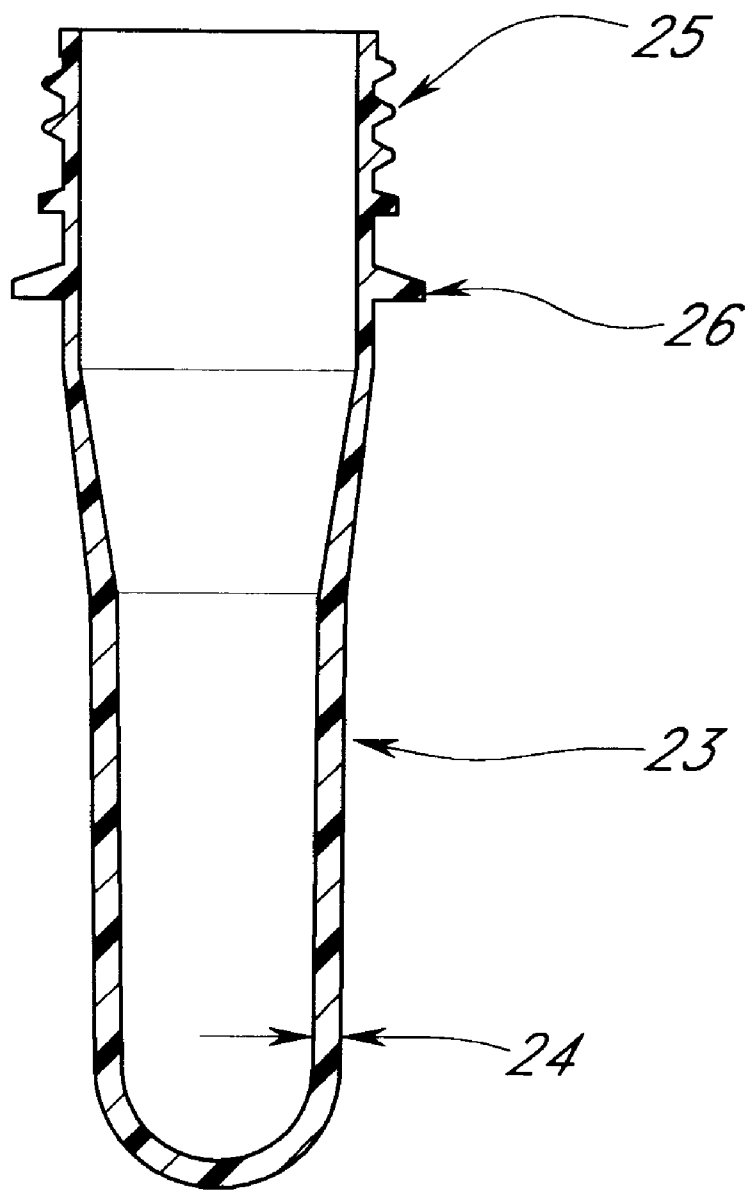
FIG. 3 is a side elevational view in section of an initial preform which can be employed in the present invention.

Referring now to FIG. 3, there is shown in sectional view an initial preform which can be used to carry out the present invention in accordance with the inject-over-inject mode or the LIM-over-inject mode as discussed above. More particularly and as illustrated in FIG. 3, an initial preform 23 is formed of an FDA-approved material, specifically, virgin polyethylene terephthalate, to have a wall thickness, as shown by dimension 24 in FIG. 3, within the range of 2.0 to 5.0 mm. The entire initial preform 23 shown in FIG. 3, including the upper threaded portion 25, is formed of virgin polyethylene terephthalate in a thickness to provide a self-sustaining preform configuration which can be stored as necessary and used subsequently to form a final preform in an inject-over-inject or LIM over inject application. The thickness of the preform can be reduced somewhat for the portion of the preform below the support ring 26, i.e., downwardly from the cylinder portion, from the thickness of the neck finish section in order to accommodate the subsequent application of the barrier material, as described in greater detail below.

The initial preform of FIG. 3 can be formed by any suitable injection molding technique, such as that disclosed in the aforementioned patent to Slat with reference to FIG. 2A and the attendant text thereof, with the exception that the initial preform is configured to provide the threaded upper end portion with its support ring and pilfer band. The initial preform as shown in FIG. 3 is then used as an interior die mandrel in the subsequent injection procedure.

Figure 4:
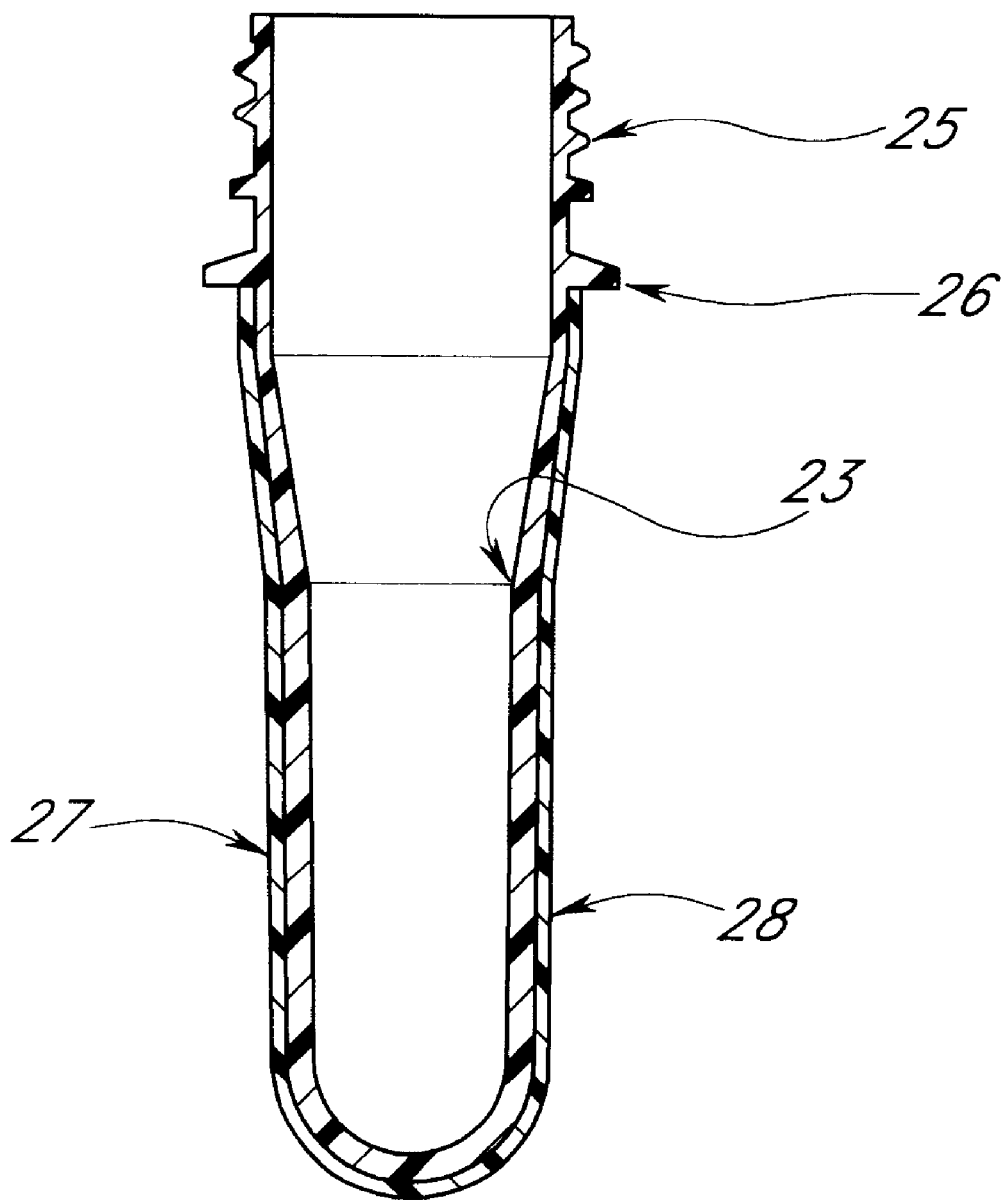
FIG. 4 is a sectional view of a final preform which can be prepared from the initial preform of FIG. 3.
Figure 4A:
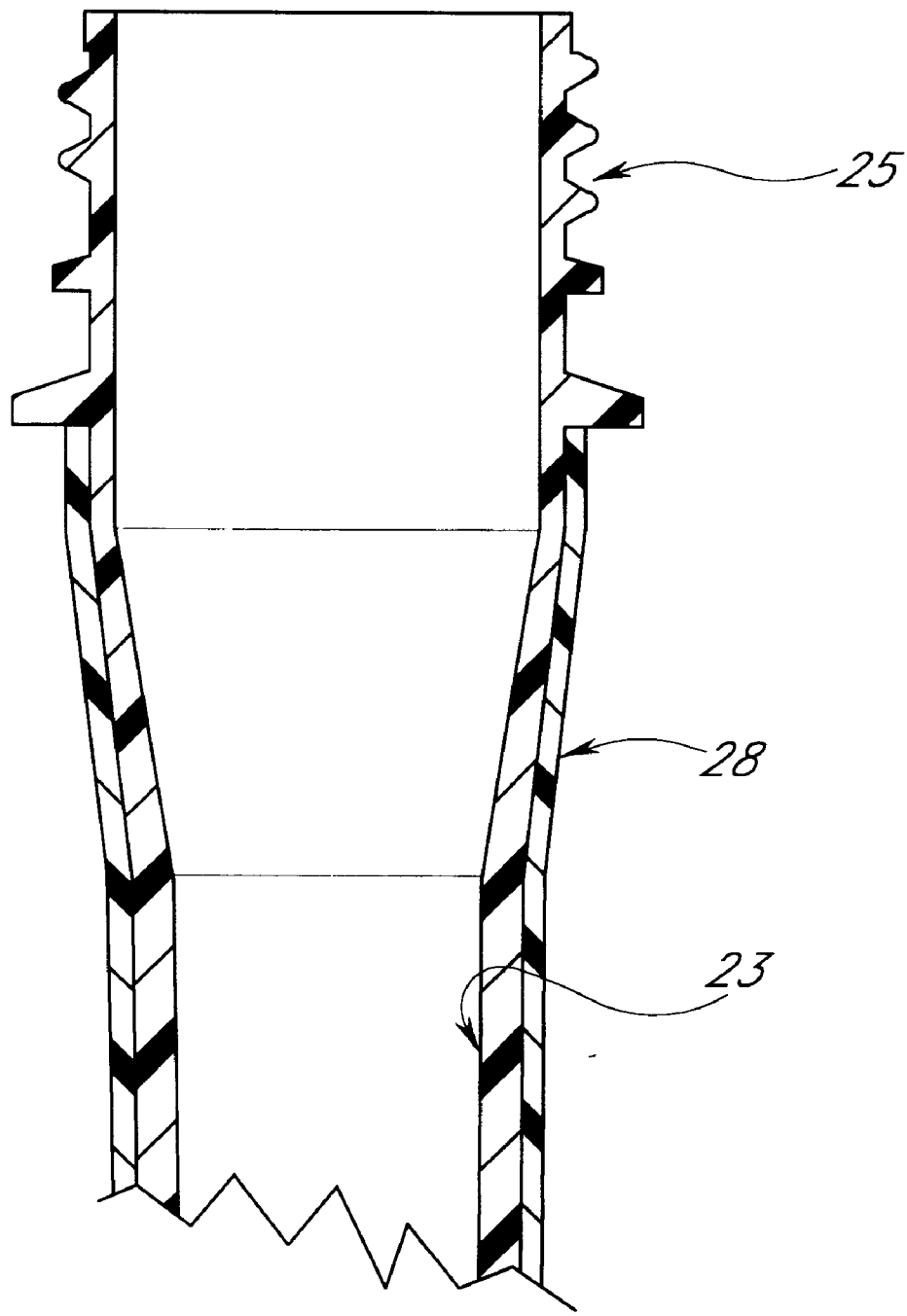
FIG. 4A is a partial sectional view showing details of the preform of FIG. 4.

FIG. 4 illustrates the final preform 27 corresponding to the initial preform of FIG. 3 as produced by the inject-over-inject application of the present invention. Here, a relatively thin layer of barrier material 28 is formed on the initial preform by an injection molding procedure to provide a thickness to form a relatively thin layer which is substantially impermeable to air, and specifically to molecular nitrogen and oxygen, and to carbon dioxide. The barrier material may be of any suitable type but preferably will take the form of a copolyester of terephthalic acid, isophthalic acid, and one or more aliphatic or aromatic diols, as described in greater detail below and as disclosed in the aforementioned patent to Jabarin, or a phenoxy-based thermoplastic polymer as disclosed in the aforementioned patents to Brennan et al. In either case, the barrier material is applied over the end cap, body portion, transition, and neck cylinder sections of the initial preform to terminate on the underside of the support ring. This portion of the preform can be formed of a somewhat smaller cross-sectional thickness than is the neck finish section of the preform. By way of example, the wall of the bottom portion of the preform may have a thickness of 3.2 millimeters; the wall of the neck finish, a cross-sectional dimension of about 3 millimeters; and the barrier material applied to a thickness of about 0.3 millimeters. This configuration showing the upper portion of the preform with a relatively thin material of the barrier material is shown in the expanded view of FIG. 4A.

When the barrier material is applied over the initial preform, the initial preform is heated to a modestly-elevated temperature which is well below the melt point of the barrier materials. More specifically, it is preferred to heat the initial preform to approximately the glass transition temperature of the preform material. The glass transition temperature of polyethylene terephthalate occurs in a window of about 75–85° C., and in carrying out the invention, it is preferred to heat the initial preform to a temperature of about 80° C. Higher temperatures can be employed, but of course, the temperature of the initial preform should be well below the melt temperature of the polyethylene terephthalate and the melt temperature of the barrier material. Usually, it is desirable to avoid heating the initial preform to a temperature significantly above the temperature of crystallization—about 120° C. for polyethylene terephthalate. In either case, for either of the above-identified barrier materials, the melt temperatures are substantially above these values, and significant heat transfer will occur between the initial preform and the applied barrier material, cooling the barrier material and raising the temperature of the polyethylene terephthalate slightly. In the case of where the barrier material is made from a copolyester of the type disclosed in the aforementioned Jabarin patent, it will usually be desirable to heat the barrier material temperature to about 275° C. during the second injection operation. Where a phenoxy-based thermoplastic polymer, such as disclosed in the aforementioned Brennan patents, is employed, a somewhat lower temperature, on the order of about 200° C., can be employed. In either case, the final preform, after application of the outer barrier layer can be cooled to room temperature and stored as desired. Thereafter, the final preform is reheated to a temperature of about 100°–105° C. in a blow-molding operation.

Figure 5:
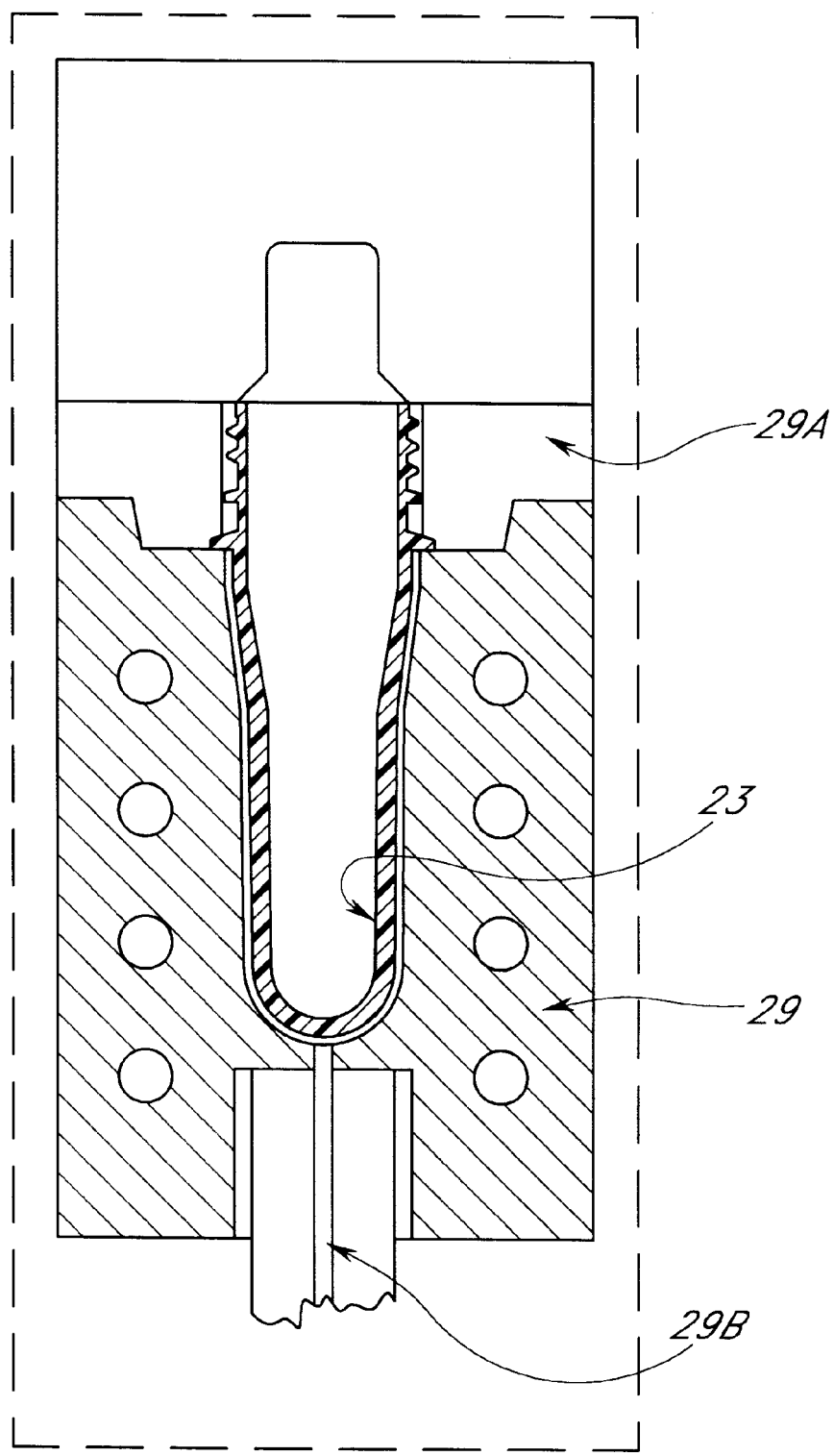
FIG. 5 is a schematic illustration in section of a molding system which can be employed in the present invention.

As noted previously, any suitable mold configurations can be used in arriving at the initial preform as shown in FIG. 3, the final preform as shown in FIG. 4, and in the blow-molding operation to ultimately arrive at the container such as shown in FIG. 2. The molding system used to form the initial preform is straightforward and can comprise an initial internal mandrel inserted within a mold cavity configured to provide for introduction of the melt material through one or more gates. The system for producing the final preform can likewise be of a conventional configuration, with the exception that the application of the barrier material is limited to the portion of the premold extending from the support ring downwardly. A suitable molding system for the final preform is shown in FIG. 5. The initial preform 23 is held in place within the mold 29 by cap segment 29A which exerts downward pressure on the upper neck finish of the initial preform to hold the support ring in an abutting relationship with the top of the mold 29. With the initial preform 23 centered within the mold cavity, the outer barrier material is introduced into the mold cavity via gate opening 29B and flows around the preform so that it surrounds the preform from the underside of the support ring downwardly. As noted previously, the initial preform may be heated to the glass transition temperature so that when the plastic barrier material is introduced into the mold and subsequently cooled, an effective bonding takes place between the initial preform and the subsequently applied barrier material.

Figure 6:
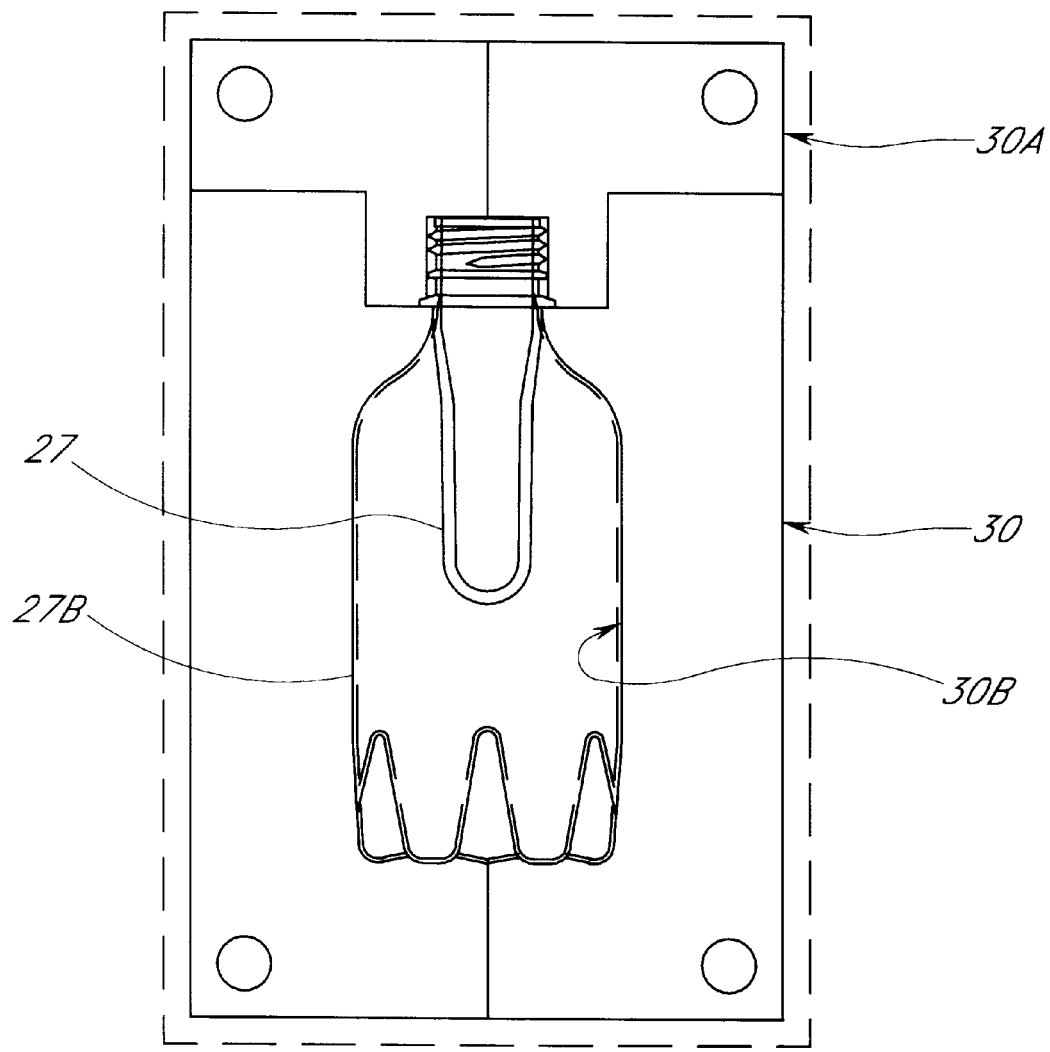
FIG. 6 is a schematic illustration, partially in section, of a blow molding system which can be employed in carrying out the present invention.

Turning now to FIG. 6, there is shown a schematic illustration with parts broken away to show the interior of a blow molding system suitable for forming the final container as shown in FIG. 2. FIG. 6 illustrates the preform 27 held in place within the blow mold body 30 by cap 30A which fits into the mold body. As will be understood by those skilled in the art, the final preform is heated to the blow molding temperature of about 105° C. in the case of the copolyester of the type disclosed in the Jabarin patent, or about 100° C. in the case of the phenoxy-based thermoplastic as disclosed in the aforementioned Brennan et al patents and then subjected to the blow molding operation with the pressure applied through the neck portion of the preform to expand the preform to the desired shape shown by broken line 27b within the mold cavity 30b.

Figure 7:
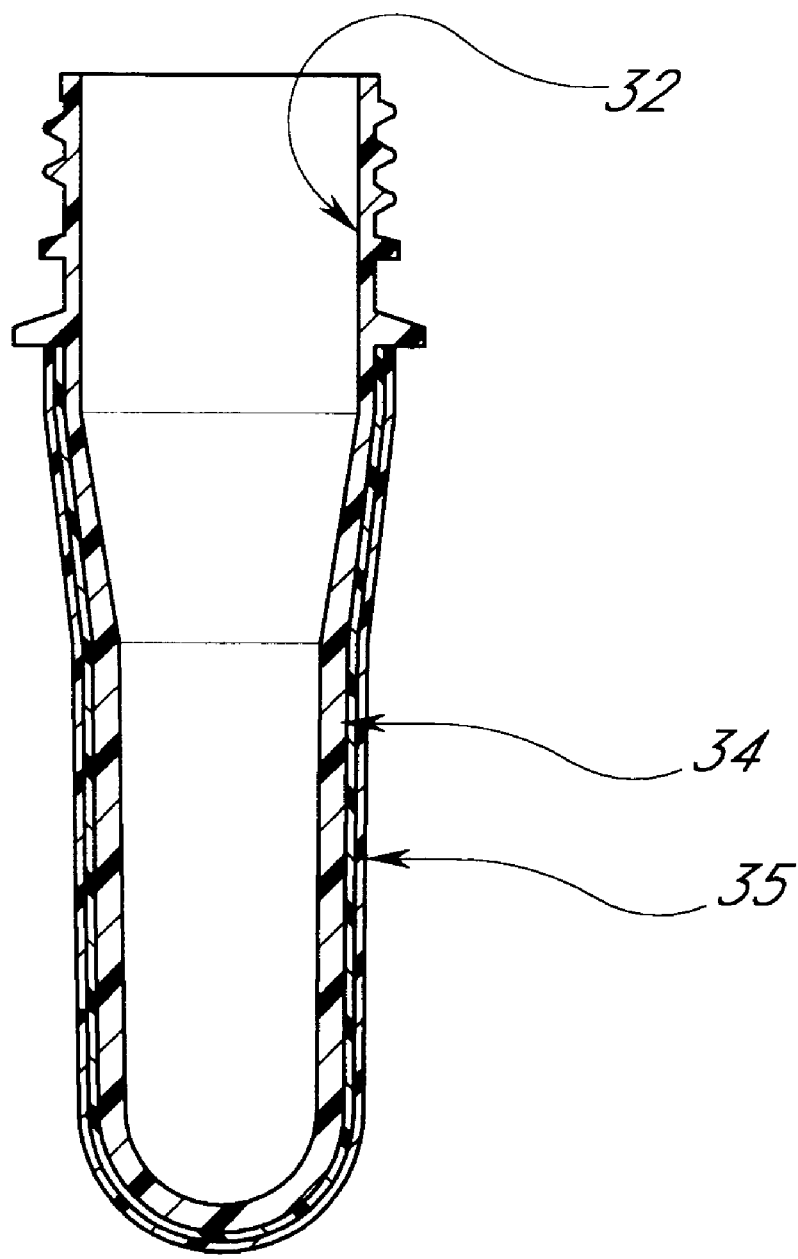
FIG. 7 is a side elevational view in section of a final preform which can be prepared in accordance with one embodiment of the present invention.

Turning now to FIG. 7, there is illustrated a final preform which can be prepared in accordance with the LIM-over-inject embodiment of the present invention. More particularly and as shown in FIG. 7, the final preform comprises an interior layer 32 of virgin polyethylene terephthalate, as provided by an initial preform as described previously with respect to FIG. 3, and subsequent layers of barrier material as indicated by reference numeral 34 and an outer layer of recycled polyethylene terephthalate as indicated by reference numeral 35. In this embodiment of the invention, the interior layer 32 resulting from the initial preform can have a thickness of about 2 mm, the intermediate barrier layer 34 about 0.2 mm, and the outer layer 35 of recycled polyethylene terephthalate of about 0.8 mm. The preferred barrier material used here is the terephthalic acid, isophthalic acid copolyester as described previously, with the intermediate barrier layer being of a substantially smaller thickness than both virgin polyethylene terephthalate and the recycled polyethylene terephthalate layers. However, the barrier materials of the aforementioned Brennon et al or other suitable thermoplastic barrier polymers may be employed. Here, as in the embodiments described previously, both the barrier material and the outer recycled polyethylene terephthalate layer extend over the wall portion of the preform including the neck cylinder to the underside of the support ring of the upper end portion as shown, in order to provide a safety factor against delamination.

Figure 7A:
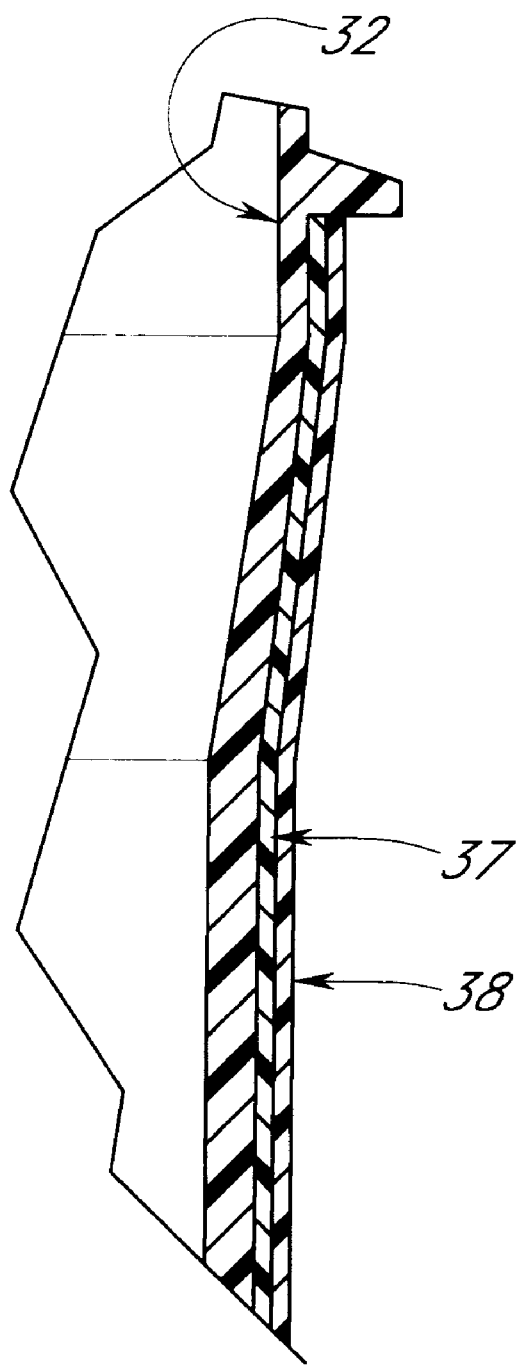
FIG. 7A is a partial view of the wall structure of a final preform which can be prepared in accordance with another embodiment of the present invention.

An alternative configuration of the LIM-over-inject mode is shown in FIG. 7A which illustrates only a portion of the wall section of a preform corresponding to the preform of FIG. 7. As shown in FIG. 7A, the barrier polymer and recycled polyethylene terephthalate are reversed, with the recycled polyethylene terephthalate layer 37 being positioned adjacent the interior PET layer and the thinner barrier layer 38 being on the outside of the preform. In the embodiments of FIG. 7 and FIG. 7A, the multilamellar injection procedure described below with respect to FIG. 8 can also be employed to arrive at a preform having repeating layers of barrier polymer and recycled PET.

Figure 8:
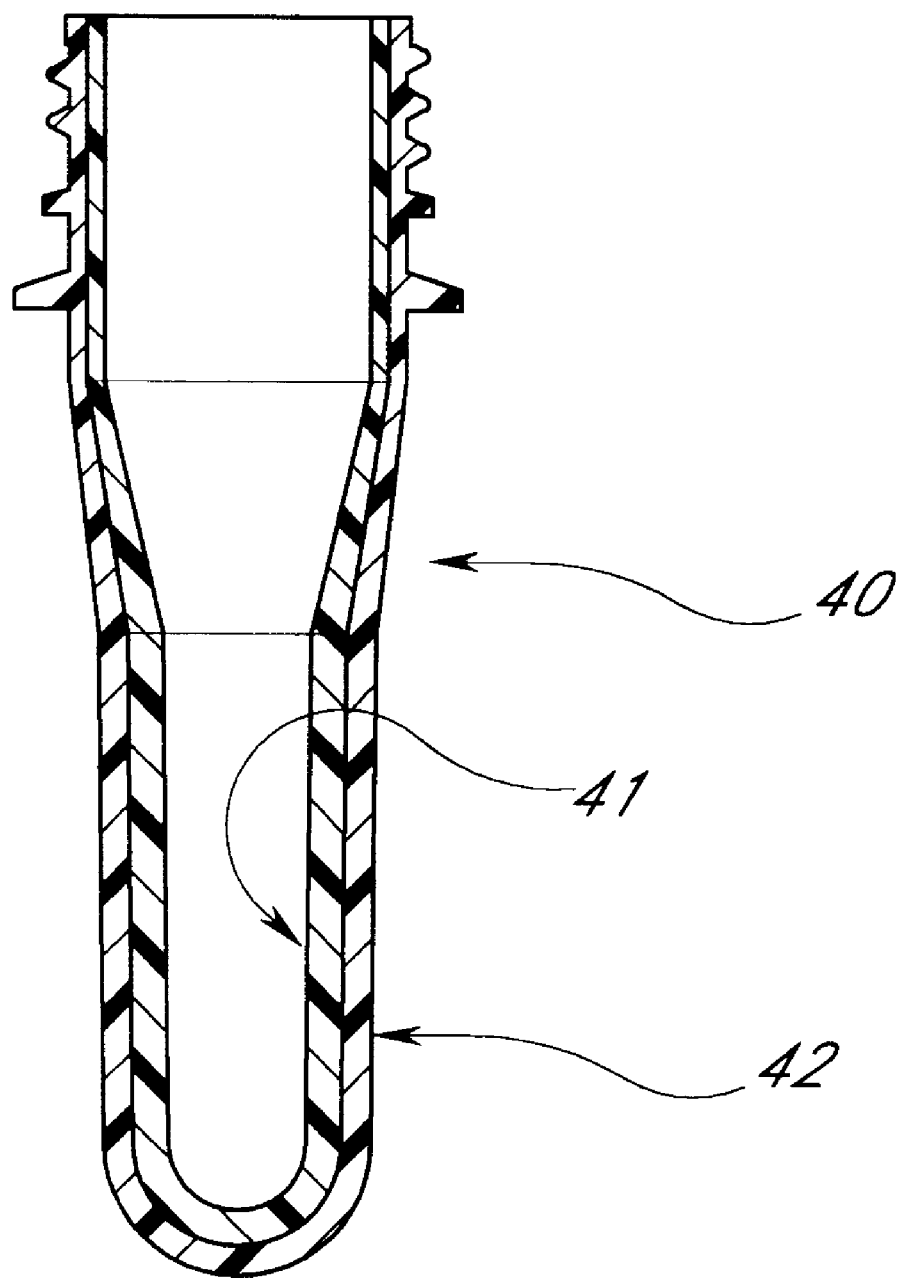
FIG. 8 is a side elevational view in section illustrating an initial preform prepared in accordance with another embodiment of the invention.
Figure 9:
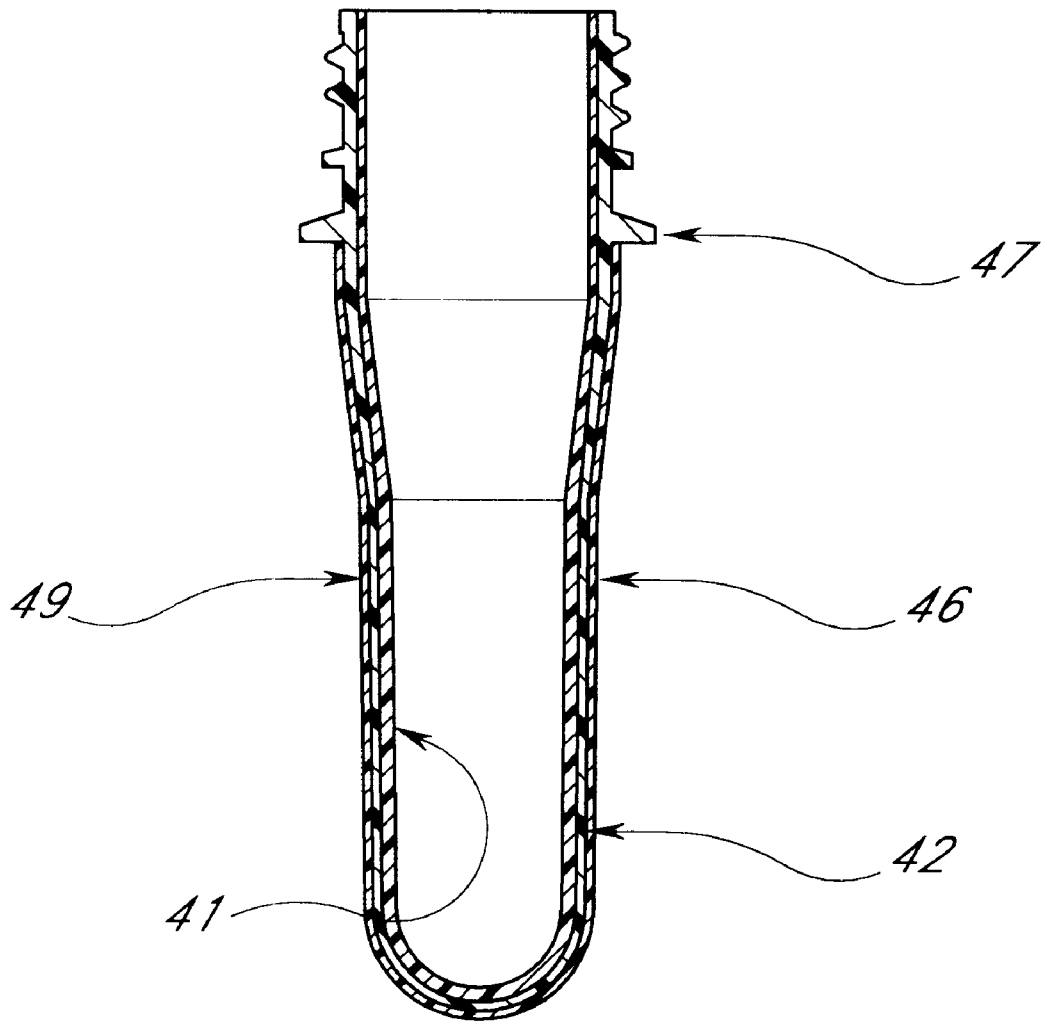
FIG. 9 is a side elevational view in section illustrating a final preform prepared from the initial preform of FIG. 8.

FIGS. 8 and 9 illustrate initial and final preforms, respectively, as formed in accordance with the preferred embodiment of the invention involving the inject-over-LIM procedure. FIG. 8 illustrates an initial preform 40 formed by lamellar injection procedure in which virgin polyethylene terephthalate and a barrier material formed of the terephthalic acid, isophthalic acid copolyester are coinjected through a lamellar injection system and applied to a mold to form the initial preform. In the embodiment illustrated in FIG. 8, the virgin polyethylene terephthalate forms the interior layer 41 and the barrier material forms the outer (and ultimately the intermediate) layer 42. The preform 40 differs from those described previously in that the barrier layer 42 extends into the neck finish area rather than terminating at the underside of the support ring.

Figure 8A:
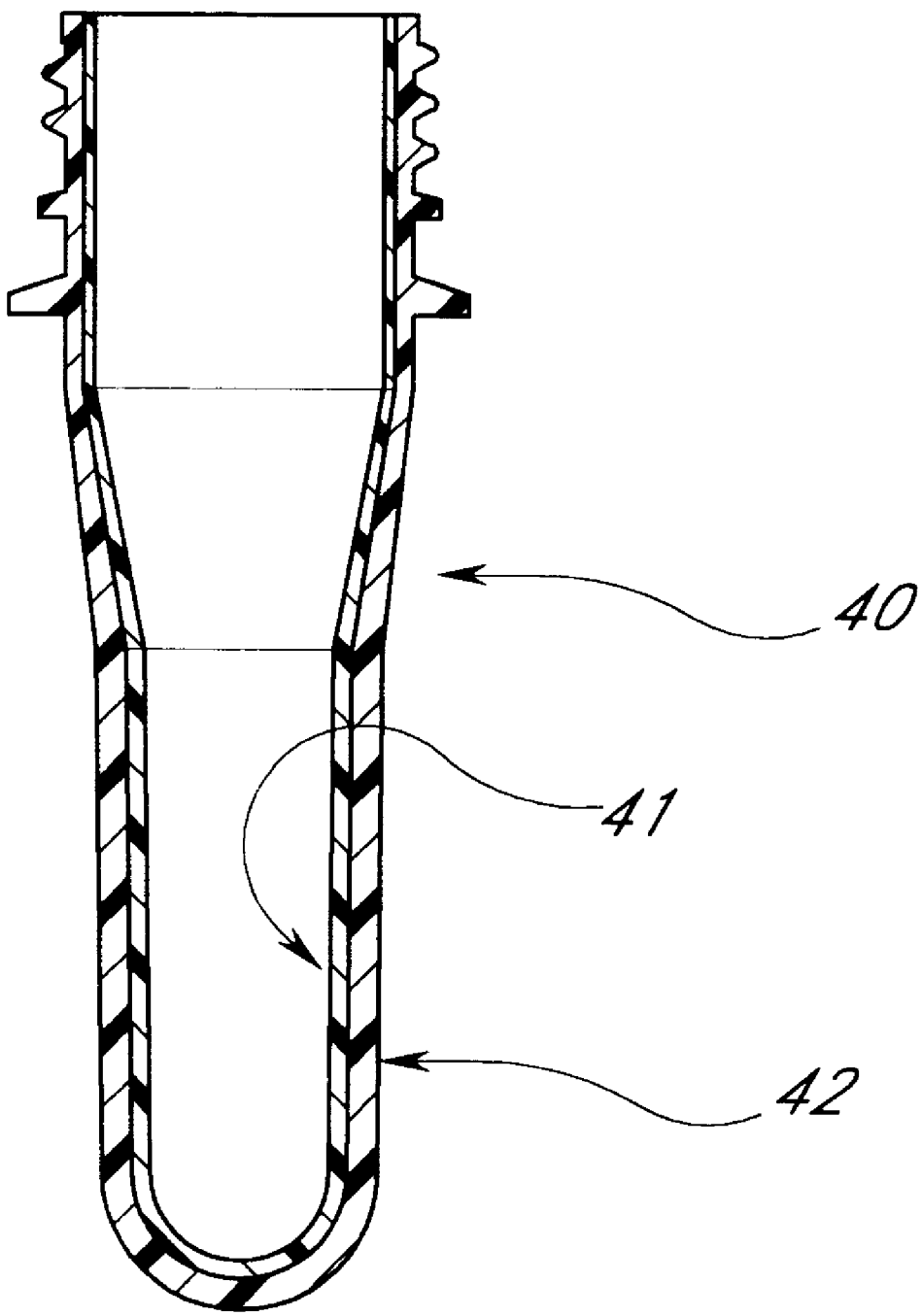
FIG. 8A is an illustration in section of an alternative configuration of yet another form of the initial preform.

The alternative configuration shown in FIG. 8A involves coinjecting the polymers through the lamellar injection system to form the barrier of the Jabarin material as the interior layer 43 of the initial preform 40A with the virgin polyethylene terephthalate forming the outer (and ultimately intermediate) layer indicated by reference numeral 44. As in the configuration of FIG. 8, the barrier material is used in a minor amount relative to the PET so that the barrier layer is relatively thin here. In either case, both the barrier material and the virgin polyethylene terephthalate are molded so that both extend into the upper neck portion of the preform comprising the support ring, pilfer band, and threads.

After forming the initial preform of FIG. 8 or 8A, this preform is then placed in a mold, as described above with reference to FIG. 5 and recycled PET, and then injected over the initial preform to form the final preform. A final preform 48 corresponding to the preform 40 of FIG. 8 is shown in FIG. 9 as comprising inner and intermediate layers of 41 and 42 of virgin PET and barrier material and outer layer 46 of recycled PET. As in the previous embodiments of the invention, the outer layer 46 preferably extends up to the bottom of the support ring 47 of the upper end portion in order to guard against delamination in either the preform or the final article. The final preform 48 can then be subjected to a blow-molding operation carried out in the system of FIG. 6.

Figure 10:
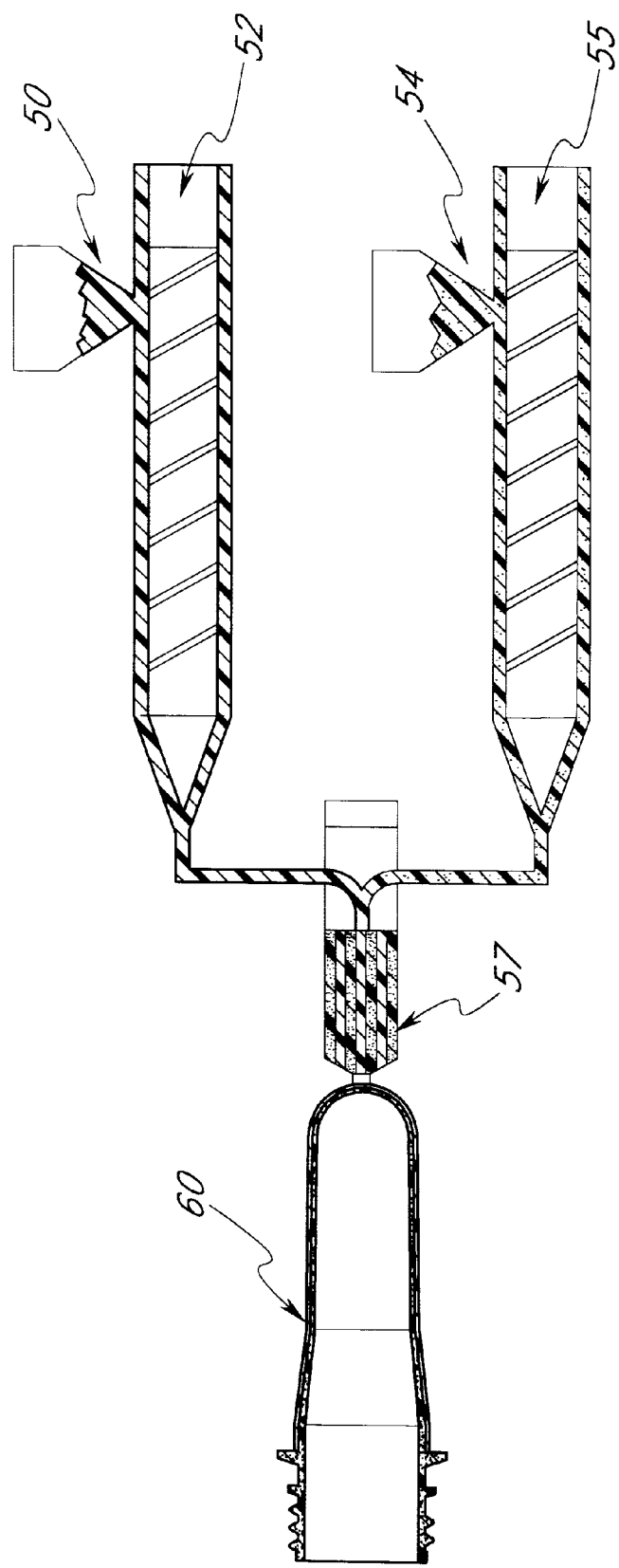
FIG. 10 is a schematic illustration of a lamellar injection system which can be used to prepare either initial or final preforms in accordance with the present invention.

FIG. 10 illustrates a suitable lamellar injection system which can be used to produce the final preform in the embodiment of FIG. 7 or the initial preform in the embodiment of FIGS. 8 and 8A. FIG. 10 illustrates a lamellar injection molding system of the type generally disclosed in the aforementioned patent to Schrenk and which is configured to apply two polymers through separate injection cylinders, corresponding generally to the extruders of Schrenk, through layer generation, and if desired, layer multiplication, to an injection mold in a LIM-over-inject mode of operation. However, as will be recognized from the following description, the same arrangement can be employed to form an initial preform in an inject-over-LIM mode of operation. More particularly, and as shown in FIG. 10, recycled polyethylene terephthalate is applied through a feed hopper 50 to a first injection cylinder 52. Simultaneously, a barrier material, specifically a polyethylene terephthalate acid, isophthalic acid co-polymer, of the type disclosed in the aforementioned patent to Jabarin, is applied through feed hopper 54 to a second injection cylinder 55. The two polymers are injected at desired rates to provide the desired relative amounts of recycled polyethylene terephthalate and barrier material. For example, in a two-layer LIM-over-inject configuration, as described previously, the recycled polyethylene terephthalate and the barrier polymer may be applied in relative amounts of 60–95 wt. % RPET and 5–40 wt. % barrier material. The outputs from cylinders 52 and 55 are applied to a layer generation system 57 in which a lamellar melt stream comprising two or more layers is formed. In the application of the invention to form only two layers to be applied out over the preform to arrive at a final preform such as illustrated in FIG. 7, layer multiplication would not be involved in feedblock 57. However, in a mode of operation to produce a plurality of alternate barrier and recycled polyethylene terephthalate layers as described below, the two-layer feedstream can be divided, flattened, and recombined in a layer multiplication scheme to produce a plurality of sublayers in the manner as disclosed in the aforementioned U.S. Pat. No. 5,202,074 to Schrenk et al, the entire disclosure of which is incorporated herein by reference. Regardless of whether a basic layer generation format or a layer multiplication format is used, the lamellar injection system is applied over the initial preform 60 which is supported in a mold (not shown in FIG. 10) of the type described previously with reference to FIG. 5.

The system of FIG. 10 can be used in the inject-over LIM mode of operation to form an initial preform of the type shown in FIGS. 8 and 8A. In this case, injection cylinder 52 will be charged with virgin polyethylene terephthalate which again can be combined with the barrier polymer and injected into a mold, in this case to form an initial preform of the type disclosed in FIG. 8. The initial preform thus formed is then placed in an injection mold of the type disclosed in FIG. 5 and recycled polyethylene terephthalate then injected to form the final preform, as shown in FIG. 9.

In either the LIM-over-inject or the inject-over-LIM embodiments, the lamellar injection system can be used to advantage to provide a plurality of repeating sublayers of polyethylene terephthalate alternating with the barrier material. This embodiment of the invention offers a further safeguard against premature diffusion of gases through the sidewall of the beverage container or other food product container and promotes adhesion of one layer to the next to avoid delamination of adjacent layers. Using the designation B for the barrier polymer and the designation A for the virgin polyethylene terephthalate, the following layer configurations are particularly preferred for the inject-over-LIM embodiment of the invention: AB, ABAB, ABABAB. The aforementioned sequences indicate the preferred layer arrangement corresponding to FIG. 8 for the inject-over-LIM embodiment in which the virgin polyethylene terephthalate forms the innermost layer of the initial preform. As indicated, where layer multiplication is employed, the same general sequence is employed, the virgin polyethylene terephthalate forming the innermost layer and the barrier material, the outermost layer, in this case with repeating sublayers of virgin polyethylene terephthalate and the barrier polymer. For the alternative embodiment of FIG. 8A, the layer configurations would be indicated by the sequence BA, BABA, BABABA, etc. In either case, the provision of repeating sublayers of polyethylene terephthalate and barrier material offer advantages of additional protection against delamination, should this occur, with resultant diffusion of gases through the sidewall of the expanded container.

The same general arrangement of barrier polymers and polyethylene terephthalate, in this case recycled polyethylene terephthalate, can be applied in the LIM-over-inject mode of operation as depicted in FIGS. 7 and 7A. Here, the preferred orientation will be BA, BABA, BABABA, etc., corresponding generally to the configuration of FIG. 7. The reverse arrangement corresponding to FIG. 7A can also be employed, providing the orientation AB, ABAB, etc. In this case the designation "A" is used for the recycled polyethylene terephthalate.

The aforementioned barrier materials are formulated to have oxygen and carbon dioxide permeabilities which are less than one-third of the oxygen and carbon dioxide permeabilities of the polyethylene terephthalate. Specifically, the barrier materials of the type disclosed in the aforementioned patent to Jabarin will exhibit permeabilities to oxygen and to carbon dioxide of about 11 and 2 cc./mil per 100 in.$^2$/day/atm, respectively. The corresponding permeability of polyethylene terephthalate to carbon dioxide can be expected to be about 12 cc./mil per 100 in.$^2$/day/atm.

The polyethylene terephthalate employed in the present invention, whether virgin polyethylene terephthalate or recycled polyethylene terephthalate, has an index of refraction for visible light within the range of about 1.40 to 1.75, depending upon its physical configuration. In the preform configuration, the polyethylene terephthalate will have an Exhibit A refractive index within the range of about 1.55 to 1.75, usually about 1.55–1.65. As will be understood by those skilled in the art, the refractive index of a solid material is defined by the constant n in accordance with the following relationship:

$$n = \frac{cv}{cn}$$

in which cv is the speed of light in a vacuum and cn is the speed of light in the medium involved. The polyethylene terephthalate in its preform configuration can be expected to have an index of refraction within the range of about 1.55 to 1.65. Amorphous polyethylene terephthalate will exhibit a value within the lower end of this range, e.g. about 1.55–1.60, whereas high crystallinity polyethylene terephthalate will exhibit a value near the upper end of this range, e.g. about 1.62–1.65. For the final product, which can be characterized as a biaxially-oriented film, since it is subject to both hoop and axial stresses in the blow molding operation, polyethylene terephthalate will exhibit a refractive index within the range of about 1.40 to 1.75, usually about 1.55 to 1.75, depending upon the stretch ratio involved in the blow molding operation. For relatively low stretch ratios of about 6:1, the refractive index will be near the lower end, whereas for high stretch ratios, about 10:1, the refractive index will be near the upper end of the aforementioned range.

Where optical clarity is desired, as usually will be the case for beverage containers and the like, the ratio of the refractive indices of the material used in forming the several layers should be in relatively close proximity to one another. Thus, using the designation $n_i$ to indicate the refractive index for polyethylene terephthalate and the designation $n_o$ to indicate the absolute refractive index for the barrier material, the ratio between the values $n_i$ and $n_o$ should be within the range of 1.0–1.2, and, more preferably, within the range of 1.0–1.1. As will be recognized by those skilled in the art for the ratio $n_i/n_o=1$, there will be substantially no diffraction of the electromagnetic radiation in the visible light range as it passes through the layer interfaces. As the ratio progressively varies from one, progressively greater distortion occurs. It will be recognized that the stretch ratios referred to herein are biaxial stretch ratios resulting from and include the product of the hoop stretch ratio and the axial stretch ratio. For example, in a blow molding operation in which the final preform is enlarged by a factor of 2.5 in the axial direction and a factor of 3.5 diametrically, the stretch ratio will be about 8.75(2.5×3.5). The previously identified barrier materials exhibit similar refractive indices and similar glass transition temperatures, specifically the glass transition temperatures for the polyethylene terephthalate, the terephthalic acid, isophthalic acid copolyester, as disclosed in the aforementioned Jabarin patent, and the polymers, as disclosed in the aforementioned Brennan patents, all can be formulated to have optimum blow temperatures within the range of about 100°–110° C.

The barrier materials, as described previously, have permeabilities to gases which are substantially less than the permeability to gases of the polyethylene terephthalate. Polyethylene terephthalate, whether in the recycled or virgin form, can be expected to have an average permeability to oxygen under ambient temperature conditions of about 12–20 cc./mil per 100 in.$^2$/day/atm.

Having described specific embodiments of the present invention, it will be understood that modifications thereof may be suggested to those skilled in the art, and it is intended to cover all such modifications as fall within the scope of the appended claims.

What is claimed:

1. A method for making a coated barrier preform comprising the steps of:
   a. providing an initial preform having an exterior surface comprising a polyester;
   b. heating the initial preform to a processing temperature wherein the processing temperature is at a temperature at or above the glass transition temperature but below the melting point of the polyester; and
   c. injecting a layer of a second material directly onto the exterior surface of the initial preform to form a coated barrier preform;
   wherein at least one of the polyester and the second material is a barrier material selected from the group consisting of (i) a copolyester of terephthalic acid, isophthalic acid and at least one diol; and (ii) a phenoxy-based thermoplastic polymer selected from the group consisting of polyhydroxy ethers, poly (hydroxy ester ethers) and poly(hydroxy amino ethers).

2. The method of claim 1, further comprising blow-molding the coated barrier preform to form a coated barrier container.

3. The method of claim 1, wherein the polyester comprises polyethylene terephthalate.

4. The method of claim 3, wherein the second material comprises a poly(hydroxy amino ether).

5. The method of claim 3, wherein the second material comprises a copolyester of terephthalic acid, isophthalic acid and at least one diol.

6. The method of claim 1, wherein the polyester comprises a copolyester of terephthalic acid, isophthalic acid and at least one diol.

7. The method of claim 6, wherein the second material comprises recycled polyethylene terephthalate.

8. The method of claim 1, wherein the processing temperature is about 75–85° C.

9. The method of claim 1, wherein the second material is injected on the exterior surface of the body portion of the initial preform.

10. The method of claim 1, wherein the second material is injected on the exterior surface of the neck portion of the initial preform.

11. The method of claim 1, wherein the initial preform is injection molded.

12. A method for making a coated barrier preform, the method comprising:

provi ding an injection molded initial preform having an exterior surface comprising a polyester, wherein the exterior surface of initial preform is at a temperature at or above the glass transition temperature but below the melt temperature of the polyester;

injecting a layer of a second material directly onto the outer surface of the initial preform to form a coated barrier preform;

wherein at least one of the polyester and the second material is a barrier material selected from the group consisting of (i) a copolyester of terephthalic acid, isophthalic acid and at least one diol; and (ii) a phenoxy-based thermoplastic polymer selected from the group consisting of polyhydroxy ethers, poly(hydroxy ester ethers) and poly(hydroxy amino ethers).

13. The method of claim 12, further comprising blow-molding the coated barrier preform to form a coated barrier container.

14. The method of claim 12, wherein the polyester comprises polyethylene terephthalate.

15. The method of claim 14, wherein the second material comprises a poly(hydroxy amino ether).

16. The method of claim 14, wherein the second material comprises a copolyester of terephthalic acid, isophthalic acid and at least one diol.

17. The method of claim 12, wherein the polyester comprises a copolyester of terephthalic acid, isophthalic acid and at least one diol.

18. The method of claim 17, wherein the second material comprises recycled polyethylene terephthalate.

19. The method of claim 12, wherein the second material is injected on the exterior surface of the body portion of the initial preform.

20. The method of claim 12, wherein the second material is injected on the exterior surface of the neck portion of the initial preform.

* * * * *

UNITED STATES PATENT AND TRADEMARK OFFICE
Certificate

Patent No. 6,312,641 B1            Patented: November 6, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gerald A. Hutchinson, Coto de Caza, CA; and Robert A. Lee, Bowdon, Cheshire, ENGLAND.

Signed and Sealed this Twenty-Second Day of July 2003.

HAROLD Y. PYON
*Supervisory Patent Examiner*
Art Unit 1700